US007082431B2

(12) United States Patent
Emura et al.

(10) Patent No.: US 7,082,431 B2
(45) Date of Patent: Jul. 25, 2006

(54) CONTENT RETRIEVAL APPARATUS AND METHOD

(75) Inventors: Koichi Emura, Yokohama (JP); Wataru Fujikawa, Yokohama (JP); Yuji Okada, Tokyo (JP); Katsunao Takahashi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 565 days.

(21) Appl. No.: 10/391,899

(22) Filed: Mar. 20, 2003

(65) Prior Publication Data

US 2003/0187829 A1 Oct. 2, 2003

(30) Foreign Application Priority Data

Mar. 28, 2002 (JP) ............................. 2002-091234
Feb. 20, 2003 (JP) ............................. 2003-043290

(51) Int. Cl.
*G06F 17/30* (2006.01)

(52) U.S. Cl. ............................ 707/10; 707/3; 707/101; 707/102; 707/103 R; 707/104.1

(58) Field of Classification Search .................... 707/3, 707/10, 101, 102, 103 R, 104.1, 205; 704/7; 715/532; 709/213
See application file for complete search history.

(56) References Cited

U.S. PATENT DOCUMENTS 5,913,215 A * 6/1999 Rubinstein et al. ........... 707/10
6,173,251 B1 * 1/2001 Ito et al. ......................... 704/7
6,629,132 B1 * 9/2003 Ganguly et al. ............ 709/213
2002/0007384 A1 1/2002 Ushioda et al.
2002/0103818 A1 * 8/2002 Amberden .................. 707/205
2003/0221171 A1 * 11/2003 Rust et al. .................. 715/532

FOREIGN PATENT DOCUMENTS

JP 6-318222 11/1994
JP 2001-160066 6/2001
JP 2001-337981 12/2001
WO 00/26766 5/2000

OTHER PUBLICATIONS

F. Nack et al., "Everything You Wanted to Know About MPEG-7: Part 1," IEEE Multimedia, IEEE Computer Society, vol. 6, No. 3, Jul. 1999, pp. 65-77.
L. Menke, "An XSLT Style Sheet and XML Dictionary Approach to Internationalization," retrieved from ftp://www6.software.ibm.com/software/developer/library/wa-xslt.pdf on Mar. 16, 2004.
English Language Abstract of JP 6-318222.
English Language Abstract of JP 2001-160066.
English Language Abstract of JP 2001-337981.

* cited by examiner

*Primary Examiner*—Thuy N. Pardo
(74) *Attorney, Agent, or Firm*—Greenblum & Bernstein, P.L.C.

(57) ABSTRACT

In the present invention, when a request query is different in expression from a viewpoint of a target content description, using a term exchange description in which a term contained in the content description and another term indicating in different expression the term are associated with each other and described, the request query or the viewpoint of the target content description is exchanged with the same term as the viewpoint or request respectively to perform content retrieval. In this way, without describing a plurality of viewpoints in a content description, it is possible to increase the number of expressions for use in request query, and to suppress the redundancy of content description.

25 Claims, 25 Drawing Sheets

32a

```
<! -- English Description of Content -- >
<Mpeg7 xml:lang="en">                                  201a
  <Description id="A" xsi:type="ContentEntityType">
    <MultimediaContent xsi:type="AudioVisualType">
      <AudioVisual>
          :
        <Temporal Decomposition>
          <AudioVisiual Segment id="Seg0">             202a
            <PointOfView viewpoint="Yamada">
              <Importance>
                <Value>0.2</Value>                     203a
              </Importance>
            </PointOfView>
              :
          </AudioVisual Segment>
        </TemporalDescomposition>
      </AudioVisual>
    </MultimediaContent>
  </Description>
</Mpeg7>
```

```
<! -- Japanese Description of Content -- >
<Mpeg7 xml:lang="ja">                                        201b
  <Discription id="A" xsi:type="ContentEntityType">
    <MultimediaContent xsi:type="AudioVisualType">
      <AudioVisual>
          :
        <Temporal Decomposition>
          <AudioVisiual Segment id="Seg0">
            <PointOfView viewpoint=" OO ">                   202b
              <Importance>
                <Value>0.2</Value>                          203b
              </Importance>
            </PointOfView>
              :
          </AudioVisual Segment>
        </TemporalDecomposition>
      </AudioVisual>
    </MultimediaContent>
  </Description>
</Mpeg7>
```

```
<! -- Definition of TermExchange datatype -- >
<element name="TermExchange" type="TermExchangeType"/>
<complexType name="TermExchangeType">
  <sequence>
    <element name="Term" minOccurs="0" maxOccurs="unbounded">
      <complexType>
        <simpleContent>
          <extension base="mpeg7:TextualType">
            <attribute name="similarity" type="mpeg7:zeroToOneType"use="optional"/>
          </extension>
        </simpleContent>
      </complexType>
    </element>
  </sequence>
</complexType>
```

```
<!-- Definition of Textual datatypes -->
<complexType name="TextualBaseType"abstract="true">
  <simpleContent>
    <extension base="string">
      <attribute ref="xml:lang"use="optional"/>
    </extension>     402
  </simpleContent>
</complexType>
<complexType name="TextualType">
  <simpleContent>
    <extension base="mpeg7:TextualBaseType"/>
  </simpleContent>
</complexType>
<!-- Definition of zeroToOne datatype -->
<simpleType name="zeroToOne Type">
  <restricton base="float">
    <minInclusive value="0.0"/>
    <maxInclusive value="1.0"/>
  </restriction>
</simpleType>
```

```
<!-- Description of TermExchange -->
<TermExchange>
  <Term xml:lang="en" similarity="1.0">Yamada<Term>    — 601
  <Term xml:lang="ja" similarity="1.0"> ○○ <Term>     — 602
  <Term xml:lang="en" similarity="0.7">Yama<Term>     — 603
</TermExchange>
```

```
<! -- Vocabluary Expanded Description of Content -- >
<Mpeg7 xml:lang="ja">
  <Discription id="A" xsi:type="ContentEntityType">
    <MultimediaContent xsi:type="AudioVisualType">
      <AudioVisual>
        :
        <Temporal Decomposition>
          <AudioVisiual Segment id="Seg0">
            <PointOfView viewpoint="Yamada">
              <Importance>
                <Value>0.2</Value>
              </Importance>
            </PointOfView>
            <PointOfView viewpoint="○○">
              <Importance>
                <Value>0.2</Value>
              </Importance>
            </PointOfView>
            </PointOfView viewpoint="Yama">
              <Importance>
                <Value>0.2</Value>
              </Importance>
            </PointOfView>
            :
          </AudioVisual Segment>
        </TemporalDecomposition>
      </AudioVisual>
    </MultimediaContent>
  </Description>
</Mpeg7>
```

FIG. 9

TermExchangeCollection.xsd

```
<?xml version ="1.0" encoding="UTF - 8"?>
<schema targetNamespace="urn:foo:te" xmlns:te="urn:foo:te" xmlns="http://www.w3.org/2001/XMLSchema"
  xmlns:mpeg7="urn:mpeg:mpeg7:schema:2001" elementFormDefault=qualified" attributeFormDefault="unqualified">
  <import namespace="urn:mpeg:mpeg7:schema:2001" schemaLocation="Mpeg7-2001.xsd"/>
  <import namespace="http://www.ww3.org/XML/1998/namespace" schemaLocation="xml-1998.xsd"/>
  <element name="TermExchangeCollection">
    <complexType>                1301
      <sequence>
        <element name="TermExchangePack" type="te:TermExchangePackType" minOccurs="1" maxOccurs="unbounded"/>
      </sequence>                1302
    </complexType>
  </element>
  <complexType name="TermExchangePackType">
    <sequence>
      <element name="Target" type="anyURI"/>  1306
      <sequence>
        <element name="TermExchange" type"te:TermExchangeType" minOccurs="1"maxOccurs="unbounded"/>
      </sequence>             1304
    </sequence>
  </complexType>
  <element name="TermExchange" type="te:TermExchangeType"/>
  <complexType name="TermExchangeType">  1305
    <sequence>
      <element name="Term" minOccurs="0" maxOccurs="unbounded">
        <complexType>  400
          <simpleContent>
            <extension base="mpeg7:TextualType">
              <attribute name="similarity" type="mpeg7:zeroToOneType" use="optionnal"/>
            </extension>          401
          </simpleContent>
        </complexType>
      </element>
    </sequence>
  </complexType>
</schema>
```

```
<?xml version="1.0" encoding="UTF-8"?>
<TermExchangeCollection xmlns= "urn:foo:te" xmlns:mpeg7= "urn:mpeg:mpeg7:schema:2001"
        xmlns:xsi= "http://www.w3.org/2001/XMLSchema-instance"
        xsi=schemaLocation= "urn:foo:te TermExchangeCollection.xsd" >
        <TermExchangePack> —— 1401a
            <Target>http://foo/mpeg7.xml</Target> —— 1402a
            <TermExchange>                                                           ⎫
                <Term xml:lang= "ja" similarity= "1.0" >□□□</Term>                  ⎬ 1403a
                <Term xml:lang= "en" similarity= "1.0" >Creator</Term>               ⎪
            </TermExchange>                                                          ⎭
            <TermExchange>                                                           ⎫
                <Term xml :lang= "ja" similarity= "1.0" >○○</Term>                   ⎬ 1403b
                <Term xml:lang= "en" similarity= "1.0" >Yamada</Term>                ⎪
            </TermExchange>                                                          ⎭
            <TermExchange>                                                           ⎫
                <Term xml :lang= "ja" similarity= "1.0" >△△</Term>                   ⎬ 1403c
                <Term xml :lang= "en" similarity= "1.0" >Taro</Term>                 ⎪
            </TermExchange>                                                          ⎭
            <TermExchange>                                                           ⎫
                <Term xml :lang= "ja" similarity= "1.0" >▽▽</Term>                   ⎬ 1403d
                <Term xml :lang= "en" similarity= "1.0" >Tokyo</Term>                ⎪
            </TermExchange>                                                          ⎭
        </TermExchangePack>
        <TermExchangePack> —— 1401b
            <Terget>http://foo/mpeg7-2.xml</Target> —— 1402b
            <TermExchange>                                                           ⎫
                <Term xml:lang= "ja" similarity= "1.0" >○×△○×△</Term>               ⎬ 1403e
                <Term xml:lang= "en" similarity= "1.0" >Island series</Term>         ⎪
            </TermExchange>                                                          ⎭
            <TermExchange>                                                           ⎫
                <Term xml:lang= "ja" similarity= "1.0" >□△○□△○</Term>               ⎬ 1403f
                <Term xml:lang= "en" similarity= "1.0" >Sports Channel</Term>        ⎪
            </TermExchange>                                                          ⎭
            <TermExchange>
                    :
            </TermExchange>
        </TermExchangePack>
</TermExchangeCollection>
```

FIG.14 http://foo/mpeg7.xml

1202a

```xml
<Mpeg7 xmlns="urn:mpeg:mpeg7:schema:2001" xmlns:xsi="http://www.w3. org/2001/XMLSchema-instance"
  xmlns:mpeg7="urn:mpeg:mpeg7:schema:2001" xml:lang="en">
  <DescriptionMetadata>
    <Version>1.1</Version>
    <LastUpdate>2001-09-20T03:20:25+09:00</LastUpdate>
    <Creator>
      <Role href ="creatorCS">
        <Name>Creator</Name>
      </Role>
      <Agent xsi:type="PersonType">
        <Name>
          <GivenName>Taro</GivenName>
          <FamilyName>Yamada</FamilyName>
        </Name>
      </Agent>
    </Creator>
    <CreationLocation>
      <Region>jp</Region>
      <AdministrativeUnit>Tokyo</AdministrativeUnit>
    </CreationLocation>
  </DescriptionMetadata>
  <Description xsi:type="ContentEntityType">
      :
  </Description>
</Mpeg7>
```

```
<Mpeg7 xmlns="urn:mpeg:mpeg7:schema:2001" xmlns:xsi="http://www.w3. org/2001/XMLSchema-instance"
    xmlns:mpeg7="urn:mpeg:mpeg7:schema:2001" xml:lang="ja">          1605
    <DescriptionMetadata>
      <Version>1.1</Version>
      <LastUpdate>2001-09-20T03:20:25+09:00</LastUpdate>
      <Creator>
        <Role href ="creatorCS">
          <Name> □□□ </Name>
        </Role>          1601
        <Agent xsi:type="PersonType">
          <Name>                1602
            <GivenName> △△ </GivenName>
            <FamilyName> ○○ </FamilyName>
          </Name>               1603
        </Agent>
      </Creator>
      <CreationLocation>        1604
        <Region>jp</Region>
        <AdministrativeUnit> ▽▽ </AdministrativeUnit>
      </CreationLocation>
    </DescriptionMetadata>
    <Description xsi:type="ContentEntityType">
        :
    </Description>
</Mpeg7>
```

FIG.16 http://foo/mpeg7-2.xml

1202c 1703 1701 1705 1704 1702

```xml
<Mpeg7 xmlns="urn:mpeg:mpeg7:schema:2001" xmlns:xsi="http://www.w3. org/2001/XMLSchema-instance"
    xmlns:mpeg7="urn:mpeg:mpeg7:schema:2001">
    <Description xsi:type="CreationDescriptionType">
        <CreationInformation>
            <Creation>
                <Title xml:lang="en" type="popular">Island series</Title>
                <Abstract>
                    <FreeTextAnnotation>Game among island rivals</FreeTextAnnotation>
                </Abstract>
                <Creator>
                    <Role href="urn:mpeg:mpeg7:cs:RoleCS:2001:PUBLISHER"/>
                    <Agent xsi:type="OrganizationType">
                        <Name xml:lang="en">Sports Channel</Name>
                    </Agent>
                </Creator>
            </Creation>
        </CreationInformation>
    </Description>
</Mpeg7>
```

FIG.17 http:foo/mpeg7-3.xml

1202d

```
<Mpeg7 xmlns="urn:mpeg:mpeg7:schema:2001" xmlns:xsi="http://www.w3. org/2001/XMLSchema-instance"
    xmlns:mpeg7="urn:mpeg:mpeg7:schema:2001">
    <Description xsi:type="CreationDescriptionType">
        <CreationInformation>
            <Creation>          1803                1801
                <Title xml:lang="ja" type="popular"> ○×△○×△ </Title>
                <Abstract>
                    <FreeTextAnnotation>Game among island rivals</FreeTextAnnotation>
                </Abstract>
                <Creator>             1805
                    <Role href="urn:mpeg:mpeg7:cs:RoleCS:2001:PUBLISHER"/>
                    <Agent xsi:type="OrganizationType">
                        <Name xml:lang="ja"> □△○□△○ </Name>
                    </Agent>         1804     1802
                </Creator>
            </Creation>
        </CreationInformation>
    </Description>
</Mpeg7>
```

```
<Results>
{
for $b in document("http://foo/mpeg7-2.xml")/Mpeg7/Description/CreationInformation/Creation   }2201
where $b/Title="Island series   }2202
return
 <Creator>
  <Role href="{$b/Creator/Role/@href}"/>   }2203
  <Agent>
   <Name xml:lang="{$b/Creator/Agent/Name/@xml:lang}">   }2204
    {$b/Creator/Agent/Name}   }2205
   </Name>
  </Agent>
 </Creator>
}
</Results>
```

FIG.19

```
<Results>
 <Creator>
  <Role href="urn:mpeg:mpeg7:cs:RoleCS:2001:PUBLISHER"/>
  <Agent>
   <Name xml:lang="en">Sports Channel</Name>
  </Agent>
 </Creator>
</Results>
```

```
<Results>
{
for $b in document("http://foo/mpeg7-3.xml")/Mpeg7/Description/CreationInformation/Creation}2401
where $b/Title="○×△○×△"  }2400
return
  <Creator>
    <Role href="{$b/Creator/Role/@href}"/>
    <Agent>
      <Name xml:lang="{$b/Creator/Agent/Name/@xml:lang}">
        {$b/Creator/Agent/Name}
      </Name>
    </Agent>
  </Creator>
}
</Results>
```

FIG.21

```
<Results>
 <Creator>
  <Role href=”urn:mpeg:mpeg7:cs:RoleCS:2001:PUBLISHER”/>
  <Agent>
   <Name xml:lang=“ja”> □△○□△○ </Name>
  </Agent>
 </Creator>
</Results>
```

```
<Results>
{
for $b in document("http://foo/mpeg7.xml")/Mpeg7/Description/CreationInformation/Creation
where $b/Title="Island series"or"○×△○×△"   }2600
return
 <Creator>
  <Role href="{$b/Creator/Role/@href}"/>
  <Agent>
   <Name xml:lang="{$b/Creator/Agent/Name/@xml:lang}">
    {$b/Creator/Agent/Name}
   </Name>
  </Agent>
 </Creator>
}
</Results>
```

```
<?xml version="1.0" encoding="UTF-8"?>
<TermExchangeCollection xmlns="urn:foo:te" xmlns:mpeg7="urn:mpeg:mpeg7:schema:2001"
    xmls:xsi="http://www.w3.org/2001/XMLSchema-instance"
    xsi=schemaLocation="urn:foo:te TermExchangCollection.xsd">
    <TermExchangePack>  ~1901
      <Target >http://foo/mpeg7-3.xml</Target>  ~1902
      <TermExchange>
        <Term xml:lang="ja" similarity="1.0">◇◇◇◇□△× </Term>  ~1904a  ┐
        <Term xml:lang="ja" similarity="0.8">◇◇◇◇ </Term>  ~1904b     │
        <Term xml:lang="ja" similarity="0.9">◎◎ </Term>  ~1904c       │
        <Term xml:lang="en" similarity="1.0">United states of America</Term>  ~1904d  ├ 1903a
        <Term xml :lang="en" similarity="0.8">America</Term>  ~1904e  │
        <Term xml:lang="en" similarity="0.9">U.S.A.</Term>  ——1904f   │
        <Term xml:lang="en" similarity="0.7">U.S.</Term>  ~1904g      ┘
      </TermExchange>
      <TermExchange>
        <Term xml :lang="ja" similarity="1.0">▽○□▽○× </Term>  ~1904h  ┐
        <Term xml :lang="en" similarity="1.0">Presidential election</Term>  ~1904i  ├ 1903b
        <Term xml:lang="en" similarity="0.9">Presidential race</Term>  ~1904j      ┘
      </TermExchange>
    <TermExchangePack>
      <TermExchange>
          :
      </TermExchange>
    </TermExchangePack>
</TermExchangeCollection>
```

```
<Mpeg7 xmlns="urn:mpeg:mpeg7:schema:2001" xmlns:xsi="http://www.w3. org/2001/XMLSchema-instance"
   xmlns:mpeg7="urn:mpeg:mpeg7:schema:2001">
   <Description xsi:type="ContentEntityType">
      <MultimediaContent xsi:type="VideoType>
         <Video>
            <TextAnnotation>
               <KeywordAnnotation xml:lang="en">
                  <Keyword>United States of America</Keyword>   2001a
                  <Keyword>Presidential election</Keyword>   2001b
               </KeywordAnnotation>
            </TextAnnotation>
         </Video>
      </MultimediaContent>
   </Description>
</Mpeg7>
```

```
Mpeg7 xmlns="urn:mpeg:mpeg7:schema:2001" xmlns:xsi="http://www.w3. org/2001/XMLSchema-instance"
    xmlns:mpeg7="urn:mpeg:mpeg7:schema:2001">
    <Description xsi:type="ContentEntityType">
      <MultimediaContent xsi:type="VideoType>
        <Video>
          <TextAnnotation>
            <KeywordAnnotation xml:lang="en">  ~2102a
              <Keyword>United States of America</Keyword>  ~2001a
              <Keyword>America</Keyword>  ~2101a
              <Keyword>U.S.A</Keyword>  ~2101b
              <Keyword>U.S.</Keyword>  ~2101c
              <Keyword>Presidential election</Keyword>  ~2001b
              <Keyword>Presidential race</Keyword>  ~2101d
            </KeywordAnnotation>
            </KeywordAnnotation xml:lang="ja">  ~2102b
              <Keyword> ◇◇◇◇□△× </Keyword>  ~2101e
              <Keyword> ◇◇◇◇ </Keyword>  ~2101f
              <Keyword> ◎◎ </Keyword>  ~2101g
              <Keyword> ▽○□▽○× </Keyword>  ~2101h
            </KeywordAnnotation>
          </TextAnnotation>
        </Video>
      </MultimediaContent>
    </Description>
</Mpeg7>
```

FIG.26

CONTENT RETRIEVAL APPARATUS AND METHOD

BACKGROUND OF THE INVENTION

1. Field of the Invention

The present invention relates to a content retrieval apparatus and method for retrieving a content description in which described are contents of a multimedia content (hereinafter referred to as a content) such as a video, audio and text.

2. Description of the Related Art

MPEG-7 has been standardized that is a description interface for retrieving and filtering a multimedia content including a video, image and audio which cannot be retrieved conventionally. It is thereby made possible to create various content descriptions using description schemes based on the XML schema standardized by W3C. Thus, the use of MPEG-7 is ready to start in broadcast, cellular communications, internet, etc.

The processing of content retrieval using MPEG-7 will be described below. MPEG-7 describes viewpoints (keywords) used in retrieving a content for each content description (for example, Japanese Laid-Open Patent Publication 2001-160066). When a client enters a desired term (keyword) as a request query for a content description, the term used in the request query entered by the client is compared with the viewpoint described in each of content descriptions stored in advance. Then, the content description is retrieved in which described is the same viewpoint as the request query. The retrieval of the content description which the client requests is thus performed.

In MPEG-7, a content description can be assigned a plurality of viewpoints. It is thus possible to assign a plurality of viewpoints described in different languages to a content description, and therefore, when a client performs content retrieval, the client is capable of using terms expressed in different languages, as a term for use in a request query. For example, when entering a name of Yamada as a term for a request query, it is possible to enter "Yamada" in English or "○○" in kanji character in Japanese. In other words, MPEG-7 supports multilingual retrieval function. In addition, "○○" are assumed to be kanji characters in Japanese expressing "Yamada" in English.

Further, in MPEG-7, a content description can be assigned a plurality of different terms having the same meaning, as viewpoints. It is thus possible for a client to use different terms having the same meaning as a term for use in a request query in performing content retrieval. For example, when entering a name of YAMADA as a request query, it is possible to enter "Yamada" in English, "Yama" as a nickname, "○○" in kanji character in Japanese, or "ΔΔΔ" in hiragana character in Japanese. In addition, "ΔΔΔ" is assumed to be hiragana characters in Japanese expressing "Yamada" in English.

However, in MPEG-7, when the number of corresponding languages is increased, it is necessary to describe in a content a plurality of viewpoints described in different languages. In other words, in MPEG-7, as the number of corresponding languages is increased, the data amount of the content description to create is increased.

Similarly, in MPEG-7, when the number of corresponding terms (vocabularies) is increased, it is necessary to describe in a content a plurality of terms viewpoints having the same meaning. In other words, in MPEG-7, as the number of corresponding terms is increased, the data amount of the content description to create is increased.

As described above, in MPEG-7, the number of corresponding languages and the number of corresponding terms are increased, whereby the number of expressions for term is increased and the degree of redundancy of content is increased. As a result, the cost performance deteriorates due to increases in the number of expressions for term, and it is made difficult to manage contents.

SUMMARY OF THE INVENTION

It is an object of the present invention to prevent the degree of redundancy of content from increasing when the number of term expressions is increased.

In order to achieve the object, in the present invention, using a term exchange description in which a term contained in each content description is associated with another term that represents the term but has a different expression, and the term contained in the content description is exchanged with the another term having the different expression.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 2 is a view showing a content description according to the first embodiment;

FIG. 3 is another view showing a content description according to the first embodiment;

FIG. 4 is a view showing a description definition for the term exchange description according to the first embodiment;

FIG. 5 is a view showing a data type of MPEG-7 standard specifications for use in term definition for the term exchange description according to the first embodiment;

FIG. 6 is a view showing an example of term exchange description according to the first embodiment;

FIG. 9 is a view showing an exchanged content description according to the second embodiment;

FIG. 13 is a view showing a description definition for a term exchange description according to the fifth embodiment;

FIG. 14 is a view showing an example of term exchange description according to the fifth embodiment;

FIG. 15 is a view showing a content description according to the fifth embodiment;

FIG. 16 is a view showing another content description according to the fifth embodiment;

FIG. 17 is a view showing another content description according to the fifth embodiment;

FIG. 18 is a view showing another content description according to the fifth embodiment;

FIG. 19 is a view showing a query expression according to the fifth embodiment:

FIG. 20 is a view showing a query result according to the fifth embodiment;

FIG. 21 is a view showing another query expression according to the fifth embodiment:

FIG. 22 is a view showing another query result according to the fifth embodiment;

FIG. 23 is a view showing another query expression according to the fifth embodiment:

FIG. 24 is a view showing an example of term exchange description according to a sixth embodiment of the present invention;

FIG. 25 is a view showing a content description according to the sixth embodiment; and FIG. 26 is a view showing another content description according to the sixth embodiment.

DETAILED DESCRIPTION OF THE PREFERRED EMBODIMENTS

First Embodiment

Figure 1:
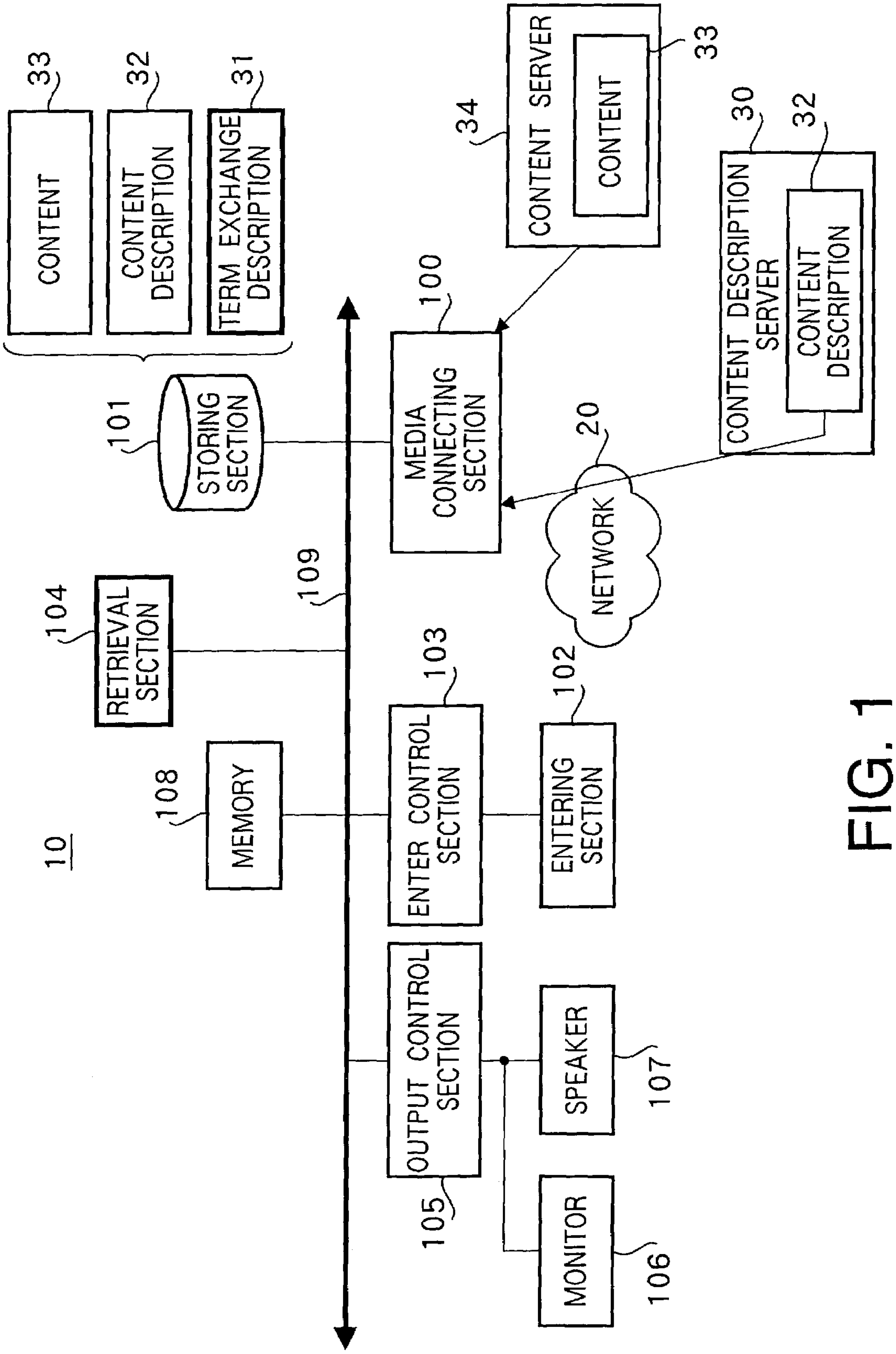
FIG. 1 is a block diagram illustrating a configuration of a content retrieval apparatus according to a first embodiment of the present invention.

A content retrieval apparatus in the first embodiment of the present invention will be described below. First, a configuration of the content retrieval apparatus in the first embodiment will be described with reference to FIG. 1. FIG. 1 is a block diagram of the content retrieval apparatus in the first embodiment.

Content retrieval apparatus 10 is provided with media connecting section 100, as communication means, which communicates with other media via network 20 such as the internet. Using media connecting section 100, content retrieval apparatus 10 communicates via network 20 with content description server 30 that stores a plurality of content descriptions 32, and obtains content descriptions 32 from content description server 30. Using media connecting section 100, content retrieval apparatus 10 communicates via network 20 with content server 34 that stores a plurality of contents 33, and obtains contents 33 from content server 34.

Content retrieval apparatus 10 is further provided with storing section 101 that stores the content descriptions obtained from content description server 30. FIGS. 2 and 3 show examples of content descriptions 32. FIGS. 2 and 3 are views each showing a content description according to the first embodiment.

As can be seen from the figures, the content descriptions are based on ISO/IEC 15938-2 and ISO/IEC 15938-5 (MPEG-7 standard specifications). As shown by 201*a* in the figure, content description 32*a* shown in FIG. 2 uses English as a language. Accordingly, as shown by 202*a* in the figure, a viewpoint is described as “Yamada” in English. Further, as shown by 203*a* in the figure, the degree of importance of the viewpoint is also described.

As shown by 201*b* in the figure, content description 32*b* shown in FIG. 3 uses Japanese as a language. Accordingly, as shown by 202*b* in the figure, a viewpoint is described as “○○” in kanji character in Japanese. Further, as shown by 203*b* in the figure, the degree of importance of the viewpoint is also described.

Storing section 101 stores term exchange description 31 to exchange terms. Term exchange description 31 is explained herein. Description definition (XML Schema Definition) 21 for term exchange description 31 is as shown in FIG. 4. Data type 22 in MPEG-7 standard specifications for use in description definition 21 for term exchange description 31 is as shown in FIG. 5. As shown by 400 in the figure, term exchange description 31 has a <Term> element indicative of a term. For a value of the <Term> element, it is possible to describe a plurality of terms which is described in different languages for the same vocabulary and/or which expresses the same meaning in different ways.

As shown by 401 in the figure, the <Term> element has a similarity attribute indicative of a similarity degree between terms. A value of the similarity attribute of 1.0 represents a simple term exchange. When a vocabulary is expanded, less than 1.0 is described as a value of the similarity attribute, and the similarity degree is described with the attribute value. As the similarity degree of the vocabulary is increased, the value of the similarity attribute is increased.

Further, as shown by 402 in the figure, the <Term> element has an xml:lang attribute, and a value of the xml:lang attribute describes a type of language.

FIG. 6 shows an example of term exchange description 31. In the example in FIG. 6, a <Term> element shown by 601 describes a term of “Yamada” in English, and further describes 1.0 as the similarity degree. A <Term> element shown by 602 describes a term of “○○” in kanji character in Japanese, and further describes 1.0 as the similarity degree. A <Term> element shown by 603 describes a term of “Yama” in English, and further describes 0.7 as the similarity degree. Terms shown by 601 to 603 are enclosed in a <TermExchange> element. In other words, “Yamada” described in English, “○○” described in Japanese and “Yama” that is a nickname are described as terms associated with one another. The similarity degrees of “Yamada” and “○○” of 1.0 indicate these terms are simply exchanged. “Yama” has a similarity degree of 0.7, and therefore, indicates a different expression from “Yamada” and “○○”.

Referring to FIG. 1 again, content retrieval apparatus 10 will be further described. Content retrieval apparatus 10 is provided with entering section 102 such as a keyboard for use in entering a term of request query. The request query that is a term entered from entering section 102 is output to retrieval section 104 through enter control section 103 and memory 108. Memory 108 is a work memory of retrieval section 104.

Retrieval section 104 retrieves segments having a viewpoint corresponding to the entered request query from content description 32, combines the retrieved segments to create a summary, and outputs the summary to output control section 105. Further, it may be possible that retrieval section 104 detects content description 32 having a viewpoint corresponding to the entered request query to output to output control section 105. In addition, the content retrieval processing in retrieval section 104 will be described specifically later.

Output control section 105 outputs a video and audio data(signal) of the summary of content 33 or content 33 which consist of retrieved segments and output from storing section 101 to monitor 106 and to speaker 107, respectively.

Monitor 106 displays video of the summary of content 33 or content 33, while speaker 107 outputs audio of the summary of content 33 or content 33.

Each processing section in content retrieval apparatus 10 is connected with system bus 109.

Figure 7:
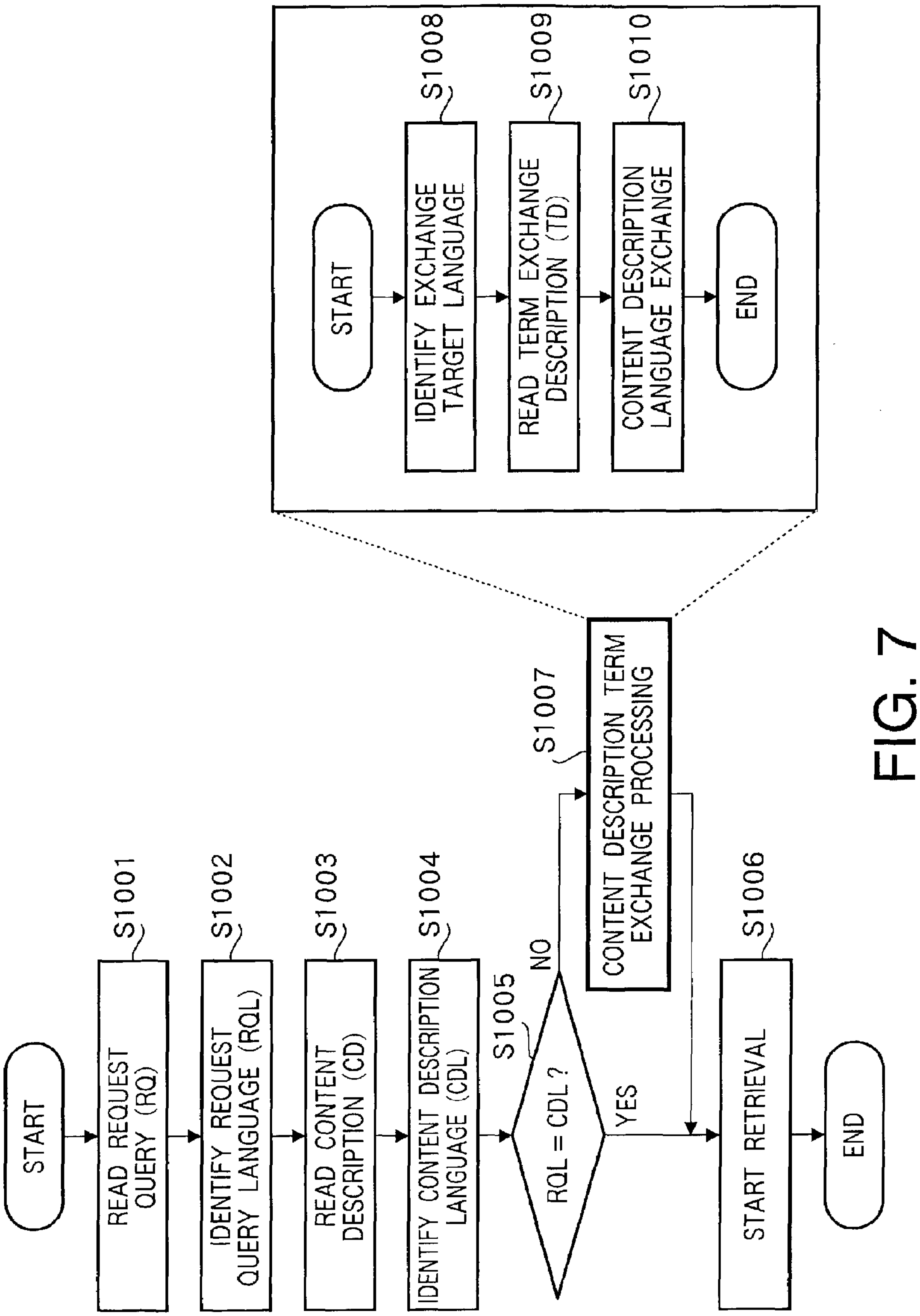
FIG. 7 is a flow diagram to explain the operation of the content retrieval apparatus according to the first embodiment.

The content retrieval operation of content retrieval apparatus 10 will be described below with reference to FIG. 7. FIG. 7 is a flow diagram to explain the operation of the content retrieval apparatus according to the first embodiment.

In content retrieval apparatus 10, when a request query (RQ) is entered from entering section 102, the entered request query (RQ) is read and stored in memory 108 via enter control section 103 (s1001), and retrieval section 104 starts retrieval.

First, retrieval section 104 identifies a description language (RQL) of the request query (RQ) in memory 108 (s1002). Then, retrieval section 104 reads content descriptions 32 (CD) stored in storing section 101 (s1003), identifies a description language (CDL) of each content description 32 (CD) (s1004), and compares the request query language (RQL) with the content description language (CDL) (s1005).

When the request query language (RQL) is the same as the content description language (CDL), retrieval section 104 performs retrieval processing on content description 32 (CD) using the request query (RQ) (s1006). Specifically, in s1006, retrieval section 104 retrieves segments having the same viewpoint as the request query (RQ) from content description 32 (CD), and combines the retrieved segments to create a summary.

In addition, it may be possible that in s1006, content description 32 (CD) having the same viewpoint as the request query (RQ) is simply retrieved and output without creating a summary.

Meanwhile, when the request query language (RQL) is different from the content description language (CDL), retrieval section 104 executes content description term exchange processing (s1007), subsequently performs the retrieval processing, and outputs query results to monitor 106 and speaker 107 (s1006).

The content description term exchange processing (s1007) will be described specifically below. Retrieval section 104 identifies the request query language (RQL) as an exchange target language for use in retrieval (s1008) Retrieval section 104 reads term exchange description 31 (TD) stored in storing section 101 (s1009), refers to a <Term> element descried in term exchange description 31 (TD), exchanges content description 32 (CD) read from storing section 101 with a new content description with a term described in the exchange target language, and thus executes the content description term exchange (s1010). Specifically, retrieval section 104 converts an xml:lang attribute in content description 32 according the request query language (RQL) that is the exchange target language, converts a language of the viewpoint described in content description 32 into the request query language (RQL), and thus creates a new content description.

For example, assuming that a request query language (RQL) is Japanese and that a content description language (CDL) is English described in content description 32*a*, in s1008 of content term exchange processing, Japanese is identified as an exchange target language (s1008), and using term exchange description 31 (TD) (s1009), the content is exchanged with content description 32*b* with a term described in Japanese that is the exchange target language so as to convert the description language (CDL) of read content description 32 (CD) into Japanese, so that a new content description is created (s1010).

In s1006, retrieval section 104 retrieves segments in the new content description assigned the same viewpoint as the request query, combines the segments to create a summary, and outputs the summary. In addition, it may be possible to retrieve a new content description assigned the same viewpoint as the request query. As described above, according to the first embodiment, when a request query language is different from a content description language, retrieval section 104 uses term exchange description 31, converts the language of a content description for retrieval into the language of the request query to create a new content description, and thus performs retrieval on the new content description corresponding to the request query. As a result, multilingual retrieval, i.e., which uses a plurality of languages in request query, is made possible. Further, since the need is eliminated of describing viewpoints in a plurality of languages in the content, the redundancy of content description is suppressed and the cost performance is thus improved.

In the first embodiment, term exchange description 31 and content descriptions 32 are described separately, whereby it is possible to manage terms and contents separately, which simplifies managements on term exchange description 31 and content descriptions 32.

According to the first embodiment, it is possible to describe content descriptions 32 based on MPEG-7 standard specifications, and to describe description definition (XML Schema Definition) 21 of term exchange description 31 based on data type 22 of MPEG-7 standard specifications. Thus describing content descriptions 32 and term exchange description 31 based on MPEG-7 provides content descriptions 32 and term exchange description 31 with versatility.

Second Embodiment

In the second embodiment of the present invention, using term exchange description 31, a content description in which a single term (single-use term) is described as a viewpoint is exchanged with a content description in which terms (synonymous words; versatile terms) in different expressions having the same meaning are described as viewpoints.

A content retrieval apparatus according to the second embodiment of the present invention will be described below. A configuration of the content retrieval apparatus in the second embodiment is the same as that of content retrieval apparatus 10 according to the first embodiment. Therefore, descriptions on the content retrieval apparatus according to the second embodiment are omitted. Term exchange description 31 is also the same as in the first embodiment.

Figure 8:
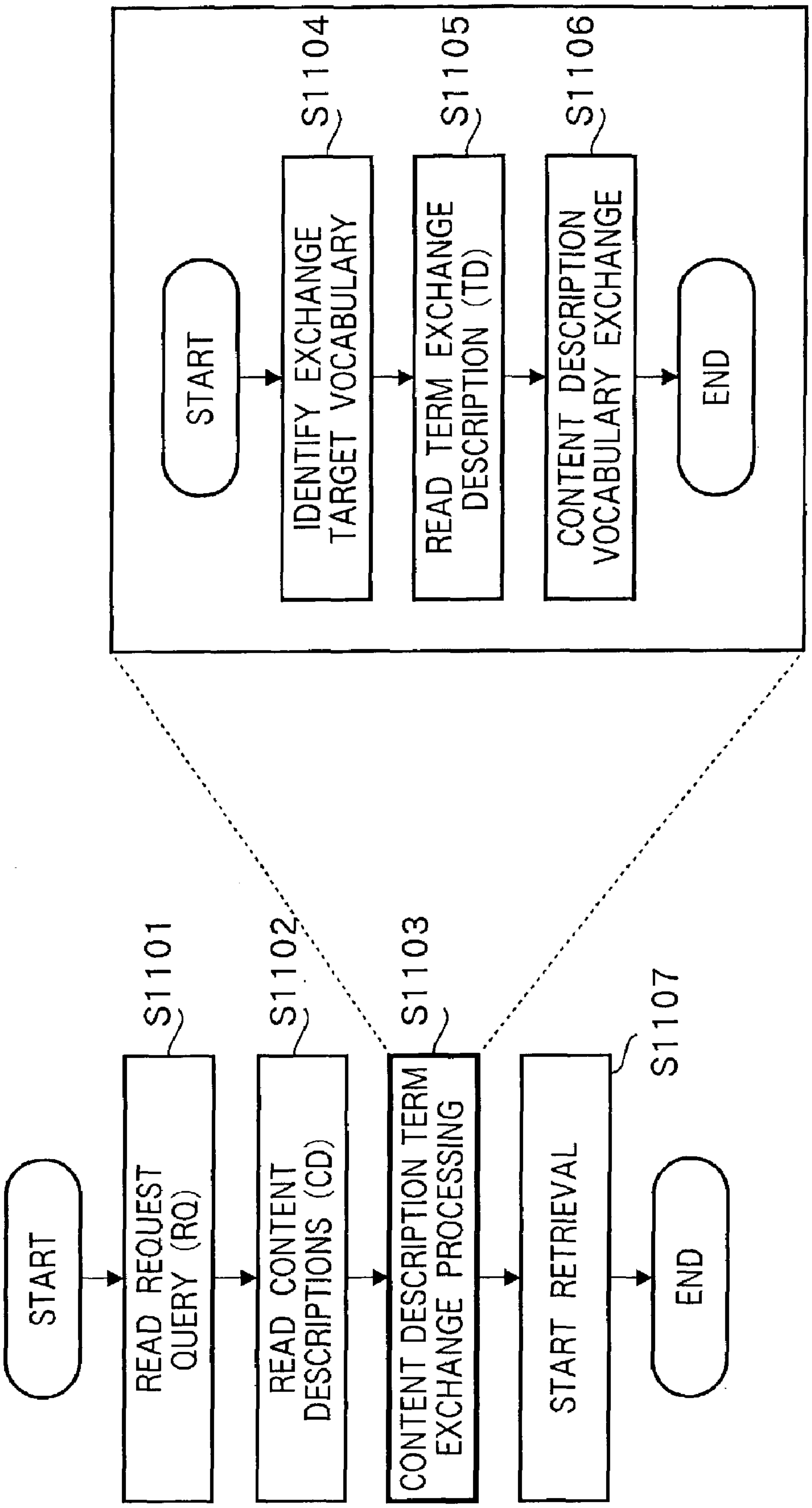
FIG. 8 is a flow diagram to explain the operation of the content retrieval apparatus according to a second embodiment of the present invention.

The retrieval processing in the content retrieval apparatus according to the second embodiment will be described below with reference to FIG. 8. FIG. 8 is a flow diagram to explain the operation of the content retrieval apparatus according to the second embodiment.

In content retrieval apparatus 10, when a request query (RQ) is entered from entering section 102, the entered request query (RQ) is read and stored in memory 108 via enter control section 103 (s1001), and retrieval section 104 starts retrieval.

First, retrieval section 104 reads content descriptions 32 (CD) stored in storing section 101 (s1102), and using term exchange description 31, shifts to content description term exchange processing (s1103) for exchanging content description 32 described with a single term (single-use term)

with a content description described with terms (versatile terms) expressed as different vocabularies (synonymous words) having the same meaning.

Retrieval section 104 identifies an exchange target vocabulary designated by a request query (RQ) or beforehand set (s1104). Then, retrieval section 104 reads term exchange description 31 (TD) from storing section 101 (s1105), and using read term exchange description 31 (TD), executes the content description term exchange processing for creating a new content description with terms (synonymous words) expressing in different ways a viewpoint described in content description 32 (s1006).

Specifically, in s1106 retrieval section 104 identifies an exchange target vocabulary and similarity degree designated in the request query (RQ). Then, using candidates for "a term that is in the language of the exchange target vocabulary and corresponds to the designated similarity degree" among a plurality of candidate terms for exchange in term exchange description 31, retrieval section 104 exchanges a viewpoint of single-use term with viewpoints of synonymous words (versatile terms) each of which is "a term that is in the language of the target exchange vocabulary and corresponds to the designated similarity degree", and thus exchanges content description 32 having a viewpoint of single-use term with a content description having viewpoints of versatile terms.

When it is assumed that a language of an exchange target vocabulary and similarity degree designated in a request query (RQ) or beforehand set are respectively Japanese and English, and 0.6 or more, using candidates for "Japanese and the similarity of 0.6 or more" or "English and the similarity of 0.6 or more", a viewpoint of single-use term is exchanged with viewpoints of versatile terms (synonymous words), and content description 32 having a viewpoint of single-use term is exchanged with a content description having viewpoints of versatile terms, thereby executing content description term exchange.

For example, when content description exchange is executed on content description 32*a* shown in FIG. 2 or content description 32*b* (each with a single-use term) shown in FIG. 3 using term exchange description 31 shown in FIG. 6, content description 34 (with synonymous words; versatile term) shown in FIG. 9 is obtained. As can be seen from the figure, "Yamada" is described as a viewpoint in a segment indicated by sego in content 32*a*, while "○○" is described as a viewpoint in a segment indicted by seg0 in content 32*b*, and thus a single term is described as a viewpoint. On the contrary, in a segment indicated by seg0 in content description 34 shown in FIG. 9 are described "Yamada", "○○" and "Yama" that are Japanese or English and have the similarity degree of 0.6 or more corresponding to "Yamada" or "○○" among terms described in term exchange description 31.

In addition, while in this embodiment a language of an exchange target vocabulary is designated by a request query (RQ), such a language may be set beforehand.

Retrieval section 104 executes content description term exchange processing (s1103), and subsequently, performs retrieval processing on a new content description that is generated by executing the content description exchange processing, using the entered request query (s1107). In addition, the retrieval processing in s1107 is the same as that in s1006 according to the first embodiment, and specific descriptions thereof are omitted.

In this way, retrieval section 104 outputs a result obtained by performing retrieval on exchanged new content description 34 using the request query.

As described above, according to the second embodiment, since term exchange description 31 is provided, when an entered request query is different from a viewpoint, retrieval can be executed after exchanging the viewpoint in a content description targeted for the retrieval with at least one term in different expression (vocabulary; synonymous word) according to the term exchange description, thereby enabling fuzzy content retrieval. Further, since it is not required to describe a plurality of viewpoints in a content, the redundancy of content description is suppressed and the cost performance is thus improved.

Further, a term exchange description is separated in description from content descriptions, whereby it is possible to manage terms and contents separately.

Third Embodiment

In the third embodiment of the present invention, a language of a request query is converted into a language of a viewpoint in a content description using term exchange description 31 to perform retrieval. Then, the viewpoint in the retrieved content description is converted into one in the language of the request query.

A content retrieval apparatus according to the third embodiment of the present invention will be described below. A configuration of the content retrieval apparatus in the third embodiment is the same as that of content retrieval apparatus 10 according to the first embodiment. Therefore, descriptions on the content retrieval apparatus according to the third embodiment are omitted. Term exchange description 31 is also the same as in the first embodiment.

Figure 10:
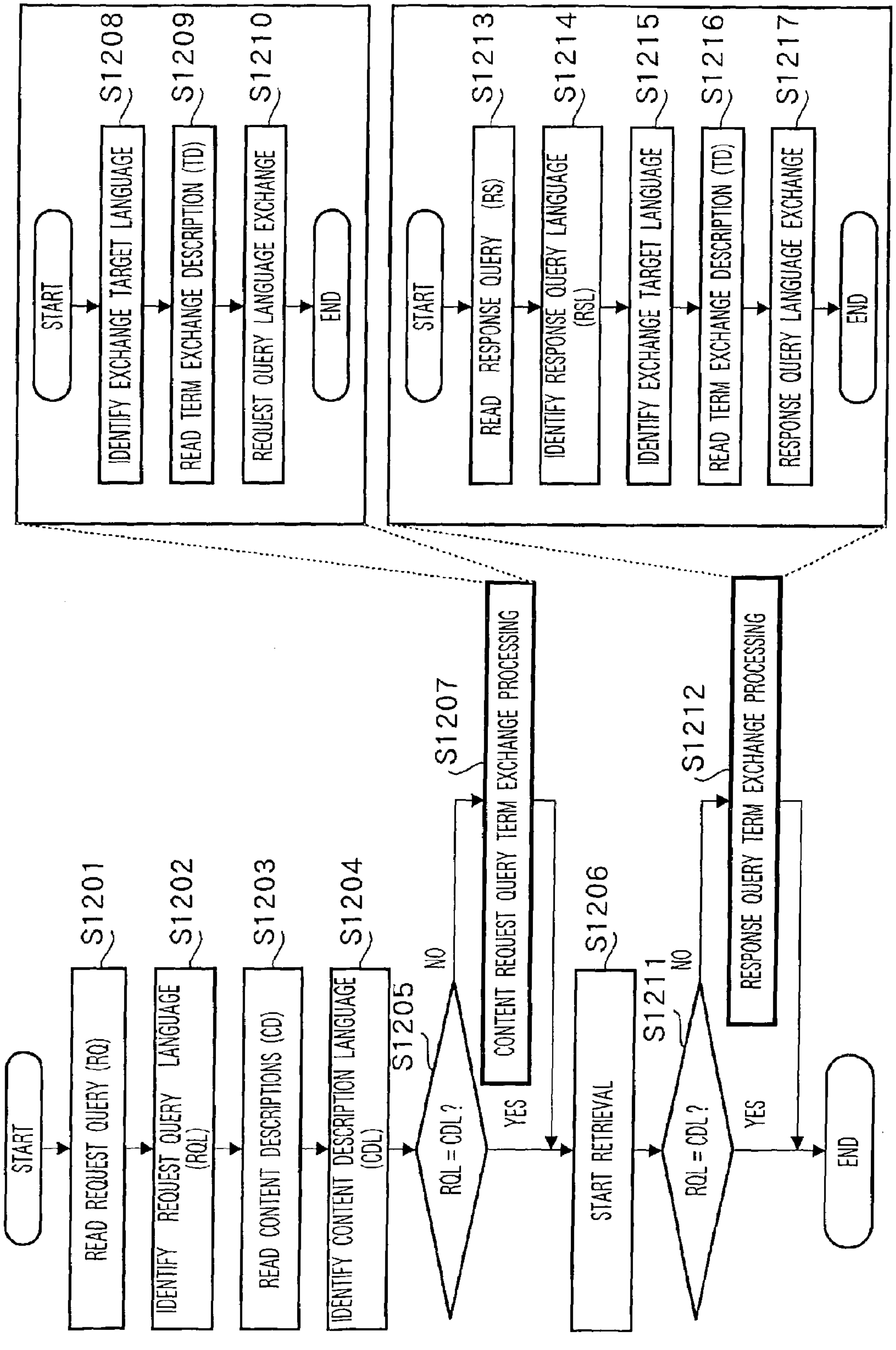
FIG. 10 is a flow diagram to explain the operation of a content retrieval apparatus according to a third embodiment of the present invention.

The retrieval processing in the content retrieval apparatus according to the third embodiment will be described below with reference to FIG. 10. FIG. 10 is a flow diagram to explain the operation of the content retrieval apparatus according to the third embodiment.

In content retrieval apparatus 10, when a request query (RQ) is entered from entering section 102, the entered request query (RQ) is read and stored in memory 108 via enter control section 103 (s1201), and retrieval section 104 starts retrieval.

First, retrieval section 104 identifies a description language (RQL) of the request query (RQ) in memory 108 (s1202). Then, retrieval section 104 reads content descriptions 32 (CD) stored in storing section 101 (s1203), identifies a description language (CDL) of each content description 32 (CD) (s1204), and compares the request query language (RQL) with the content description language (CDL) (s1205).

When the request query language (RQL) is the same as the content description language (CDL), retrieval section 104 executes retrieval processing on content descriptions 32 (CD) for the request query (RQ) (s1206). In addition, the retrieval processing in s1206 is the same as that in s1006 in the first embodiment, and specific descriptions thereof are omitted.

Meanwhile, when the request query language (RQL) is different from the content description language (CDL), retrieval section 104 executes request query term exchange processing (s1207), and subsequently performs the retrieval processing (s1206).

The request query term exchange processing (s1207) will be described below. Retrieval section 104 identifies the language (CDL) of content description 32 as an exchange target language for use in retrieval (s1208). Retrieval section 104 reads term exchange description 31 (TD) stored in storing section 101 (s1209).

Then, retrieval section 104 refers to a <Term> element descried in term exchange description 31 (TD), exchanges the term with another term which has the same meaning as the term described in description language (RQL) of the request query (RQ) and which is described in description language (CDL) of content description 32, and uses a request query with the exchanged another term as a new request query (RQ) (s1210).

For example, when it is assumed that the request query language (RQL) is Japanese and the language (CDL) of content description 32 is English, in s1207 of request query term exchange processing, CDL (English) is identified as an exchange target language (s1208), term exchange description 31 (TD) read from storing section 101 is used (s1209), and the request query (RQ) in description language (RQL=Japanese) is exchanged with a request query described in English that is the exchange target language, thus executing the request query language exchange (s1210).

Using the new request query exchanged in s1210, retrieval section 104 executes retrieval processing on content descriptions (s1206).

Then, since the language of response query (RS) retrieved in s1206 is the content description language (CDL) and is different from request query language (RQL) which is the entered language that the user can understand, retrieval section 104 shifts to the processing for converting the language of the response query (RS) to the request query language (RQL).

In order to determine whether or not the language of the query result (RS) is the same as the request query language (RQL), retrieval section 104 compares the request query language (RQL) with the content description language (CDL) (s1211). When the request query language (RQL) is the same as the content description language (CDL), the response query (RS) is described in the same language as that of the request query language. In other words, the query result (RS) is described in the same language as that the user uses, the language exchange is not executed, and the response query (RS) is output to finish the processing.

Meanwhile, when the request query language (RQL) is different from the content description language (CDL), it is required to describe the response query (RS) in the same language as the request query language (RQL) which is the language that the user understands. Then, retrieval section 104 shifts to the response query term exchange processing (s1212).

In s1212 of the response query term exchange processing, retrieval section 104 reads the response query (RS) obtained by performing retrieval on content description 32 using the request query described in the content description language (CDL) (s1213), identifies the description language (RSL) of the response query (RS) (s1214), further identifies the request query language (RQL) as an exchange target language (s1215), reads term exchange description 31 (TD) from storing section 101 (s1216), and using term exchange description 31, executes the response query language exchange for converting the response query language (RSL) of the response query (RS) to the request query language (RQL) that is the exchange target language (s1217).

For example, in s1212 of response query term exchange processing, when it is assumed that the content description language (CDL) is English and response query language (RSL) and the request query language (RQL) are Japanese, retrieval section 104 identifies the response query language (RSL) as Japanese, further identifies RQL (Japanese) as an exchange target language, and using term exchange description 31 (TD) read from storing section 101, exchanges the response query (RS) described in the content description language (CDL=English) with a response query described in Japanese that is the exchange target language, thus executing the response query language exchange.

Retrieval section 104 outputs the response query (RS) resulting from the response query language exchange.

As described above, according to the third embodiment, when a request query language is different from a content description language, retrieval section 104 converts the request query written in the request query language to the content description written in the content description language using term exchange description 31, and using a request query in converted language, performs retrieval on the content description. As a result, it is possible to use a request query in language different from that of content description 32. In other words, multilingual retrieval is allowed. Further, since the need is eliminated of describing terms in a plurality of languages in the content, the redundancy of content description is suppressed and the cost performance is thus improved.

Further, according to the third embodiment, when a content description is retrieved using an exchanged request query, the language of a result response is converted to the request query language and then output. It is thus possible to convert the language of the response query to the language that the user uses, i.e., the user understands.

Fourth Embodiment

In the fourth embodiment, a request query is exchanged with a different term having the same meaning by the use of term exchange description 31 to execute retrieval.

A content retrieval apparatus according to the fourth embodiment of the present invention will be described below. A configuration of the content retrieval apparatus in the fourth embodiment is the same as that of content retrieval apparatus 10 according to the first embodiment. Therefore, descriptions on the content retrieval apparatus according to the fourth embodiment are omitted. Term exchange description 31 is also the same as in the first embodiment.

Figure 11:
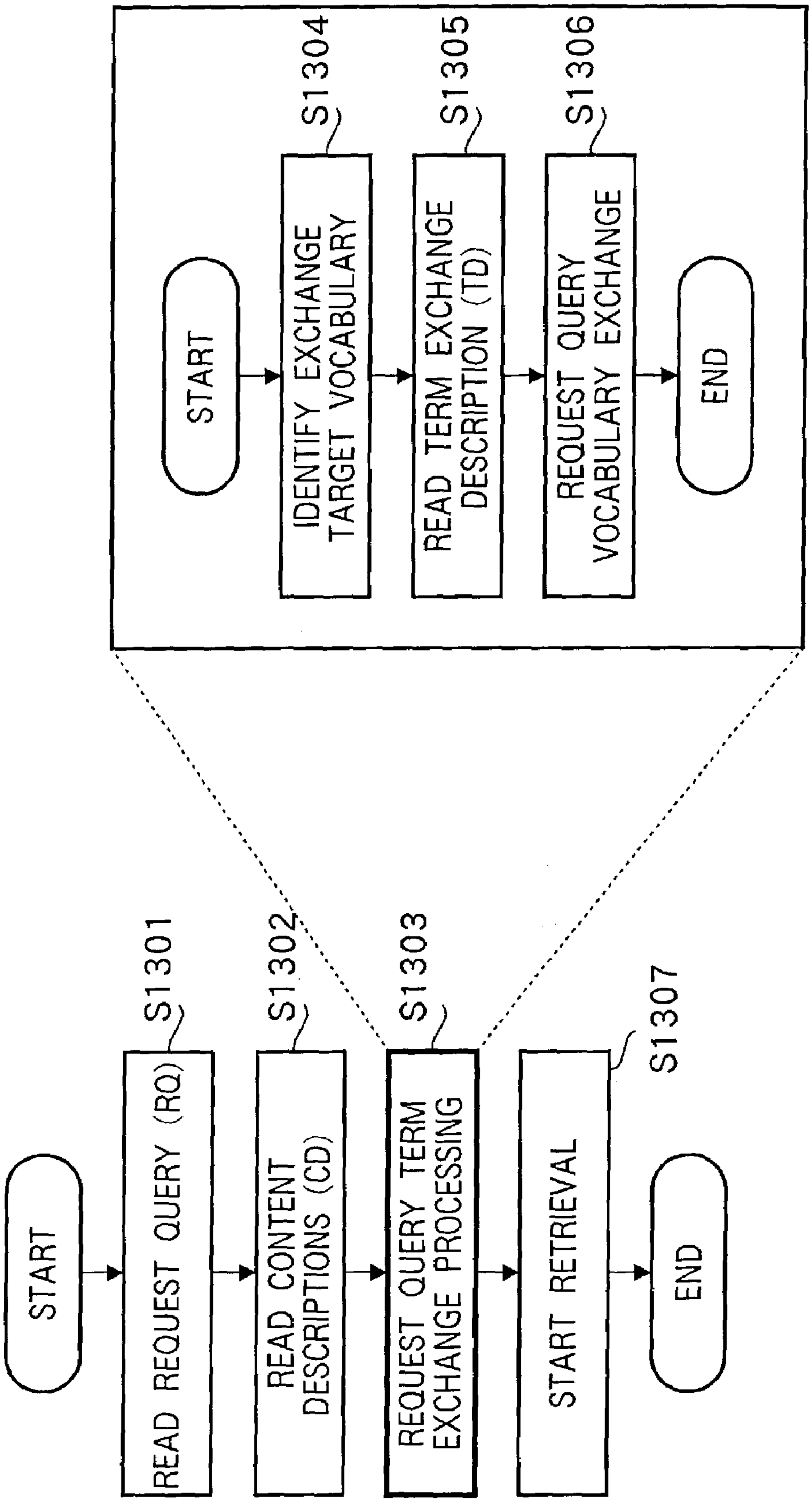
FIG. 11 is a flow diagram to explain the operation of a content retrieval apparatus according to a fourth embodiment of the present invention.

The retrieval processing in the content retrieval apparatus according to the fourth embodiment will be described below with reference to FIG. 11. FIG. 11 is a flow diagram to explain the operation of the content retrieval apparatus according to the fourth embodiment.

In content retrieval apparatus 10, when a request query (RQ) is entered from entering section 102, the entered request query (RQ) is read and stored in memory 108 via enter control section 103 (s1301), and retrieval section 104 starts retrieval.

First, retrieval section 104 reads content descriptions 32 (CD) stored in storing section 101 (s1302), and using term exchange description 31, shifts to request query term exchange processing (s1303) for exchanging a request query (RQ) with a different term (vocabulary) having the same meaning.

In s1303 of request query term exchange processing, retrieval section 104 identifies an exchange target vocabulary (s1304), and using term exchange description 31 (TD) read from storing section 101 (s1305), executes request query vocabulary exchange (s1306).

For example, when it is assumed that a language of an exchange target vocabulary and similarity degree designated in a request query (RQ) are respectively Japanese and 0.6 or more, using candidates for "Japanese and the similarity of 0.6 or more" among a plurality of candidates for the exchange in term exchange description 31, the request query (single-use term) composed of a single term is exchanged with request queries (synonymous words; versatile terms) with a plurality of terms, thereby executing the request query vocabulary exchange.

In s1304 of the request query term exchange processing, retrieval section 104 performs retrieval on content descriptions 32 using the request query (RQ) that is an exchanged synonymous word (versatile term) to output to a query result (s1307). Further, when a plurality of request queries (RQs) are obtained in s1307, retrieval section 104 performs retrieval on content descriptions 32 using all the plurality of request queries (RQs).

In addition, since the retrieval processing in s1307 is the same as that in s1006 in the first embodiment, specific descriptions thereof are omitted.

Thus, retrieval section 104 provides a query result obtained by performing retrieval on content descriptions 32 using an exchanged request query (synonymous word; versatile term).

As described above, according to the fourth embodiment, it is possible to perform content description retrieval after exchanging a request query with at least one of different vocabularies using term exchange description 31. It is thus possible for a user to perform so-called fussy retrieval for performing retrieval using a term having the same meaning as that of a term used as a viewpoint in a content description without knowing the term as the viewpoint. Further, since it is not required to describe a plurality of viewpoints in a content description, the redundancy of content description is suppressed and the cost performance is thus improved.

In addition, in the above-mentioned embodiments, retrieval section 104 and term exchange description 31 may be provided on server side or other site, instead of being provided on client side. Further, while content descriptions 32 are obtained from a content description server via networks, it may be possible to obtain content descriptions 32 in different manners. For example, content descriptions 32 stored in a storage medium such as a CD-ROM, a DVD-ROM or a memory card may be stored in storing section 101.

The description methods of content descriptions 32 and term exchange description 31 used in the present invention are of examples, and other various descriptions may be used. In the method of identifying an exchange target vocabulary, a term and similarity degree are used, but information other than the similarity degree may be used, and its combination is not limited to the foregoing.

The processing in retrieval section 104 of the present invention may be implemented by software using a computer, or using dedicated hardware with the function of the processing.

Fifth Embodiment

In the fifth embodiment of the present invention, a term contained in a content description is exchanged with that in different language, in order to suppress the redundancy of content description in increasing the number of languages for the term.

Figure 12:
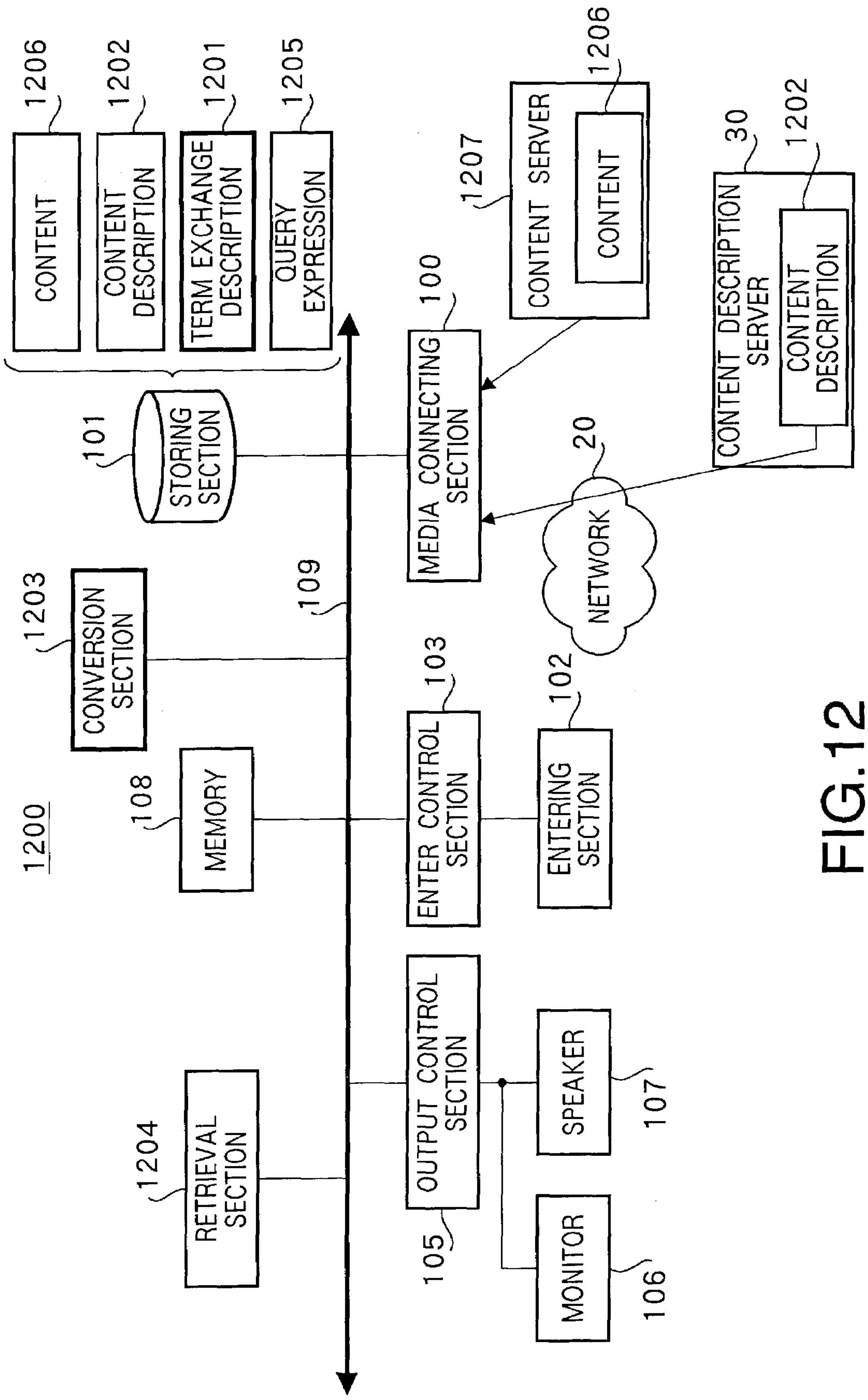
FIG. 12 is a block diagram illustrating a configuration of a content retrieval apparatus according to a fifth embodiment of the present invention.

A content retrieval apparatus according to the fifth embodiment will be described. A configuration of the content retrieval apparatus according to the fifth embodiment will be described first with reference to FIG. 12. FIG. 12 is a block diagram of the content retrieval apparatus according to the fifth embodiment. In addition, the same sections as those described previously are assigned the same reference numerals and specific descriptions thereof are omitted.

Content retrieval apparatus 1200 according to the fifth embodiment is provided with conversion section 1203. Conversion section 1203 exchanges content descriptions 1202 using term exchange description 1201 stored in storing section 101.

Content retrieval apparatus 1200 is further provided with retrieval section 1204 which retrieves content description 1202 corresponding to a request query entered from entering section 102 using query expression 1205 stored in storing section 101, and retrieves terms contained in retrieved content description 1202.

In addition, content descriptions 1202 stored in storing section 101 are obtained from content description server 30.

Term exchange description 1201 according to the fifth embodiment will be described below with reference to FIGS. 13 and 14. First, referring to FIG. 13, the description definition (XML Schema Definition) of term exchange description 1201 is explained.

As shown by 1301 in the figure, in description definition 1300 according to the fifth embodiment, Term Exchange Collection is defined as an element.

As shown by 1302 in the figure, it is defined that at least one Term Exchange Pack can be described as an element in Term Exchange Collection 1301. Further, as shown by 1306 in the figure, it is defined that URL of a target content description is described in Term Exchange Pack 1302.

As shown by 1304 in the figure, it is defined that at least one Term Exchange can be described in Term Exchange Pack 1302.

Term Exchange 1305 is the same as that in the first embodiment. Specifically, as shown by 400 in the figure, Term Exchange 1305 has a <Term> element indicative of a term. As a value of the <Term> element, it is possible to describe a plurality of terms which is described in different languages for the same vocabulary and/or which expresses the same meaning in different ways. Further, as shown by 401 in the figure, the <Term> element has a similarity attribute indicative of a similarity degree between terms. A value of the similarity attribute of 1.0 represents a simple term exchange. When a vocabulary is expanded, less than 1.0 is described as a value of the similarity attribute, and the similarity degree is described with the attribute value. As the similarity degree of the vocabulary is increased, the value of the similarity attribute is increased.

By thus defining description definition 1300, it is possible to describe a plurality of terms collectively for each meaning, using Term Exchange Pack 1302. In this way, term exchange description 1201 has a plurality of groups each with a term and other terms expressing the term in different languages.

A specific example of term exchange description 1201 will be described below with reference to FIG. 14. FIG. 14 shows the term exchange description according to the fifth embodiment.

In term exchange description 1201*a* according to the fifth embodiment are described a plurality of Term Exchange Packs, 1401*a* and 1401*b*. In Term Exchange Packs 1401*a* and 1401*b* are described target URLs, 1402*a* and 1402*b*, respectively.

In Term Exchange Pack 1401*a* is described a plurality of Term Exchanges, 1403*a* to 1403*d*.

In Term Exchange 1403*a* are described terms of "Creator" in English and "□□□" in Japanese each as a <Term> element and respective similarity degrees of 1.0. Thus, "Creator" in English and "□□□" in Japanese are associated with each other and described. In addition, "□□□" are assumed to be kanji characters in Japanese expressing "Creator" in English.

In Term Exchange 1403*b* are described terms of "Yamada" in English and "○○" in Japanese each as a <Term> element and respective similarity degrees of 1.0. Thus, "Yamada" in English and "○○" in Japanese are associated with each other and described.

In Term Exchange 1403*c* are described terms of "Taro" in English and "ΔΔ" in Japanese each as a <Term> element and respective similarity degrees of 1.0. Thus, "Taro" in English and "ΔΔ" in Japanese are associated with each other and described. In addition, "ΔΔ" are assumed to be kanji characters in Japanese expressing "Taro".

In Term Exchange 1403*d* are described terms of "Tokyo" in English and "∇∇" in Japanese each as a <Term> element and respective similarity degrees of 1.0. Thus, "Tokyo" in English and "∇∇" in Japanese are associated with each other and described. In addition, "∇∇" are assumed to be kanji characters in Japanese expressing "Tokyo".

In Term Exchange Pack 1401*b* is described a plurality of Term Exchanges, 1403*e* and 1403*f*.

In Term Exchange 1403*e* are described terms of "Island series" in English and "○×Δ○×Δ" in Japanese each as a <Term> element and respective similarity degrees of 1.0. Thus, "Island series" in English and "○×Δ○×Δ" in Japanese are associated with each other and described. In addition, "○×Δ○×Δ" is assumed to be a Japanese word expressing "Island series" in English.

In Term Exchange 1403*f* are described terms of "Sports Channel" in English and "□Δ○□Δ○" in Japanese each as a <Term> element and respective similarity degrees of 1.0. Thus, "Sports Channel" in English and "□Δ○□Δ○" in Japanese are associated with each other and described. In addition, "□Δ○□Δ○" is assumed to be a Japanese word expressing "Sports Channel" in English.

In this way, by using Term Exchange Packs 1401*a* and 1401*b*, it is possible to collect term exchanges corresponding to different content descriptions in a single term exchange description.

Further, a plurality of Term Exchanges, 1403*a* to 1403*f*, is described in Term Exchange Packs 1401*a* and 1401*b*, whereby it is possible to describe all the terms contained in target content descriptions and terms which have the same meaning as respective terms and are described in different expressions.

In Term Exchanges 1403*e* and 1403*f*, a phrase is used as a term. Thus, a phrase can be used as a term in term exchange description 1201*a*.

The content description conversion processing in content description conversion section 1203 will be described specifically below.

The processing will be described first that content description conversion section 1203 converts content description 1202*a* shown in FIG. 15 into content description 1202*b* shown in FIG. 16, using term exchange description 1201*a*.

Content description conversion section 1203 refers to content description 1202*a*, and further refers to </Creator> from <Creator> that is information on a person that creates content description 1202*a*. Then, content description conversion section 1203 retrieves "Creator" 1501 indicative of a role of the person that created content description 1202*a*, "Taro" 1502 indicative of first name of the person that created content description 1202*a*, and "Yamada" 1503 indicative of last name of the person that created content description 1202*a*.

Next, content description conversion section 1203 retrieves "Tokyo" 1504 that is information on a location where content description 1202*a* was created.

Content description conversion section 1203 refers to 1403*a* to 1403*d* in the figure that are portions corresponding to content description 1202*a* in term exchange description 1201*a*, and retrieves terms respectively expressing retrieved "Creator" 1501, "Taro" 1502, "Yamada" 1503 and "Tokyo" 1504 in different language.

Specifically, content description conversion section 1203 retrieves "□□□" for "Creator" 1501, "ΔΔ" for "Taro" 1502, "○○" for "Yamada" 1503, and "∇∇" for "Tokyo" 1504.

Next, content description conversion section 1203 exchanges a portion of "Creator" 1501 with "□□□" 1601, a portion of "Taro" 1502 with "ΔΔ" 1602, a portion of "Yamada" 1503 with "○○", 1603, and a portion of "Tokyo" 1504 with "∇∇" 1604.

Content description conversion section 1203 exchanges "en" 1505 of the xml:lang attribute value of <Mpeg7> element indicative of description language of content description 1202*a* with "ja" 1605.

Thus, content description conversion section 1203 converts content description 1202*a* with terms described in English to content description 1202*b* with terms described in Japanese.

The processing will be described below that content description conversion section 1203 converts content description 1202*c* shown in FIG. 17 into content description 1202*d* shown in FIG. 18, using term exchange description 1201*a*.

Content description conversion section 1203 refers to content description 1202*c*, and further refers to </Creation> from <Creation> that is information on content description 1202*c*. Then, content description conversion section 1203 retrieves "Island series" 1701 indicative of a title of content description 1202*c*, and "Sports Channel" 1702 indicative of name of an agent that created content description 1202*c*. Content description conversion section 1203 refers to 1403*e* and 1403*f* in the figure that are portions corresponding to content description 1202*c* in term exchange description 1201*a*, and retrieves terms respectively expressing retrieved "Island Series" 1701 and "Sports Channel" 1702 in different language.

Specifically, content description conversion section 1203 retrieves "○×Δ○×Δ" for "Island Series" 1701 and "□Δ○□Δ○" for "Sports channel" 1702.

Next, content description conversion section 1203 exchanges a portion of "Island Series" 1701 with "○×Δ○×Δ" 1801, and a portion of "Sports Channel" 1702 with "□Δ○□Δ○" in content description 1202*c*.

Content description conversion section 1203 exchanges "en" 1703 and 1704 of the xml:lang attribute value of <Mpeg7> element indicative of description language of elements <Title> and <Name> with "ja" 1803 and 1804, respectively.

Thus, content description conversion section 1203 converts content description 1202*c* with terms described in English into content description 1202*d* with terms described in Japanese.

The operation of retrieval section 1204 will be described specifically below.

Retrieval section 1204 performs retrieval using query expression 1205 based on XQuery standard of W3C.

Query expression 1205 will be described with reference to FIG. 19 specifically. FIG. 19 is a view showing a query expression according to the fifth embodiment.

As shown by 2201 in the figure, in query expression 1205*a* shown in FIG. 19 are described a reference URL (http://foo/mpeg7-2.xml) of the content description and a reference portion (/Mpeg7/~/Creation) in the content description.

Further, in query expression 1205*a* is described a conditional expression for determining whether a term described in Title of the content description is "Island series" that is a retrieval term. In addition, this example shows a query expression when "Island series" is entered from entering section 102 as a retrieval term.

Query expression 1205*a* has the description for executing processing below "return" when the condition shown by 2202 in the figure is met.

Specifically, query expression 1205*a* has a description for substituting a described term into a position inside "{ }" below "return".

In this example, into inside "{ }" shown by 2203 in the figure is substituted a value of an attribute of <Name> element below <Agent> element below <Creator> element below <Creation> element below <CreationInformation> element below <Description> element below <Mpeg7> element in the content description (<Mpeg7> element to <Creation> element are assumed as variable $b). Into inside "{ }" shown by 2204 in the figure is substituted a value of the xml:lang attribute of <Name> element below <Agent> element below <Creator> element below variable $b in the content description. Into inside "{ }" shown by 2205 in the figure is substituted a value of <Name> element below <Agent> element below <Creator> element below variable $b in the content description.

In addition, since query expression 1205*a* is based on XQuery, the portion of "< >" is output as a result.

FIG. 20 shows a result obtained in retrieval section 1204 by performing retrieval on the content 1202*c* shown in FIG. 17 using query expression 1205*a* shown in FIG. 19.

As shown in FIG. 20, retrieval section 1204 outputs portions of "< >" described in query expression 1205*a* without performing any processing.

Retrieval section 1204 substitutes terms corresponding to the inside of "{ }" of query expression 1205*a*.

Specifically, the section 1204 substitutes the term shown by 1705 in FIG. 17 into a portion shown by 2301 in FIG. 20, the term shown by 1704 in FIG. 17 into a portion shown by 2302 in FIG. 20, and the term shown by 1702 in FIG. 17 into a portion shown by 2303 in FIG. 20.

In this way, using query expression 1205*a*, retrieval section 1204 retrieves terms contained in content description 1202*c* corresponding to the input retrieval terms.

The retrieval will be described below that is performed by retrieval section 1204 using a query expression shown in FIG. 21.

Query expression 1205*b* shown in FIG. 21 indicates a case where "○×Δ○×Δ" is entered as a retrieval term. Accordingly, as shown by 2400 in the figure, in query expression 1205*b* is described a conditional expression for determining whether or not a term described in "Title" in the content is "○×Δ○×Δ" that is the retrieval term.

Further, since query expression 1205*b* corresponds to content description 1202*c* shown in FIG. 18, a reference location of the content description is described in the expression 1205*b* as shown by 2401 in the figure.

When retrieval section 1204 performs retrieval on content description 1202*d* shown in FIG. 18 using query expression 1205*b* shown in FIG. 21, the section 1204 outputs a query result shown in FIG. 22.

Retrieval section 1204 substitutes the term shown by 1805 in FIG. 18 into a portion shown by 2501 in FIG. 22, the term shown by 1804 in FIG. 18 into a portion shown by 2502 in FIG. 22, and the term shown by 1802 in FIG. 18 into a portion shown by 2503 in FIG. 22.

FIG. 23 shows another example of query expression.

Query expression 1205C shown in FIG. 23 corresponds to a plurality of retrieval terms. Specifically, the expression 1205*c* indicates a case where "Island series" and "○×Δ○×Δ" are entered each as a retrieval term. Accordingly, as shown by 2600 in the figure, in query expression 1205*c* is described a conditional expression for determining whether or not a term described in "Title" in the content description is "Island series" or "○×Δ○×Δ" that is the retrieval term.

When retrieval section 1204 performs retrieval using query expression 1205*c*, the section 1204 retrieves content descriptions in which "Island series" or "○×Δ○×Δ" is described in "Title", and further retrieves terms contained in the retrieved content descriptions.

In this way, it is also possible to perform retrieval using retrieval terms expressed in different languages.

In addition, while the above-mentioned retrieval is performed on "Title", retrieval of another portion can be performed when converting and expanding a value of "where" in line 4.

For example, retrieval of viewpoint can be performed by rewriting line 3 to "for $b in document (http://foo/mpeg7.xml)/Mpeg7/Description/MultimediaContent/AudioVisual/TemporalDecomposition/AudiovisualSegment", and further writing line 4 to where "$b/PointOfView/@viewpoint='Yamada'".

Further, by rewriting line 4 to where "$b/PointOfView/@viewpoint='Yamada'" and "$b/PointOfView/@viewpoint/Importance/Value>0.2", it is possible to retrieve segments with the value of viewpoint 'Yamada' and an importance degree of 0.2 or more in the content description.

As described above, according to the fifth embodiment, it is possible to exchange a term contained in the content description with a term in different language. As a result, since the need is eliminated of describing terms in a plurality of different languages in a content description, it is possible to suppress the redundancy of content description even when the number of languages for a term is increased.

In addition, the fifth embodiment is also achieved by content retrieval apparatus 1200 without retrieval section 1204, i.e., content description conversion apparatus.

Sixth Embodiment

In the sixth embodiment of the present invention, a term contained in a content description is exchanged with a synonymous word that is another term having the same meaning as the term and different expression from the term, in order to suppress the redundancy of content description in increasing the number of expressions of the term.

A content retrieval apparatus according to the sixth embodiment will be described below. A configuration of the content retrieval apparatus according to the sixth embodiment is the same as that in the fifth embodiment, and descriptions thereof are omitted.

Term exchange description 1201 according to the sixth embodiment will be described. The description definition (XML Schema Definition) for term exchange description 1201 is the same as description definition 1300 shown in FIG. 13 described in the fifth embodiment, and descriptions thereof are omitted.

A specific example of term exchange description according to the sixth embodiment will be described with reference to FIG. 24. FIG. 24 shows the term exchange description according to the sixth embodiment.

In term exchange description 1201*b* according to the sixth embodiment is described Term Exchange Pack 1901. In Term Exchange Pack 1901 is described target URL 1902.

Further, a plurality of Term Exchanges, 1903*a* and 1903*b*, is described in Term Exchange Pack 1901.

In Term Exchange 1903*a* are described as <Term> elements "◇◇◇◇□Δ×" 1904*a* in Japanese, "◇◇◇◇" 1904*b* in Japanese, "◎◎" 1904*c* in Japanese, "United States of America" 1904*d* in English, "America" 1904*e* in English, "U.S.A." 1904*f* in English and "U.S." 1904*g* in English.

In addition, it is assumed that "◇◇◇◇□Δ×" expresses in Japanese "United State of America" in English, "◇◇◇◇" expresses a Japanese abbreviation of "United State of America" in English, and that "◎◎" expresses in Kanji in Japanese "United States of America" in English.

Further, a similarity degree is assigned to each term as follows: 1.0 to "◇◇◇◇□Δ×" 1904*a* of Japanese; 0.8 to "◇◇◇◇" 1904*b* of Japanese; 0.9 to "◎◎" 1904*c* of Japanese; 1.0 to "United States of America" 1904*d* of English; 0.8 to "America" 1904*e* of English; 0.9 to "U.S.A." 1904*f* of English; and 0.7 to "U.S." 1904*g* of English. Terms shown in 1904*a* to 1904*g* are thus described.

In Term Exchange 1903*b* are described as <Term> elements "∇○□∇○×" 1904*h* in Japanese, "Presidential election" 1904*i* in English and "Presidential race" 1904*j* in English.

In addition, "∇○□∇○×" are assumed to express in Kanji in Japanese "Presidential election" in English.

Further, a similarity degree is assigned to each term as follows: 1.0 to "∇○□∇○×" 1904*h* of Japanese; 1.0 to "Presidential election" 1904*i* of English; and 0.9 to "Presidential race" 1904*j* of English. Terms shown in 1904*h* to 1904*j* are thus described.

In this way, a plurality of Term Exchanges, 1903*a* and 1903*b*, is described in Term Exchange Pack 1901, whereby it is possible to describe all the terms contained in target content descriptions, respective synonymous terms and respective terms in different languages.

The content description conversion processing in content description conversion section 1203 according to the sixth embodiment will be described specifically below. The processing will be described that content description conversion section 1203 converts content description 1202*e* shown in FIG. 25 into content description 1202*f* shown in FIG. 26, using term exchange description 1201*b*. The following descriptions illustrate a case where a user performs content description conversion using terms of all similarity degrees through entering section 102.

Content description conversion section 1203 refers to content description 1202*e*, and retrieves "United States of America" 2001*a* and "Presidential election" 2001*b* that are keywords of content description 1202*a*.

Then, content description conversion section 1203 refers to 1903*a* and 1903*b* in the figure that are portions corresponding to content description 1202*e* in term exchange description 1201*b*, and retrieves terms respectively expressing in different manner retrieved "United States of America" 2001*a* and "Presidential election" 2001*b*.

Specifically, content description conversion section 1203 retrieves "America", "U.S.A.", "U.S.", "◇◇◇◇□Δ×", "◇◇◇◇" and "◎◎" for "United States of America" 2001*a*, and "∇○□∇○×" and "Presidential race" for "Presidential election" 2001*b*.

Then, content description conversion section 1203 adds "America" 2101*a*, "U.S.A." 2101*b*, "U.S." 2101*c*, "Presidential race" 2101*d*, "◇◇◇◇□Δ×" 2101*c*, "◇◇◇◇" 2101*f*, "◎◎" 2101*g* and "∇○□∇○×" 2101*h* to "United States of America" 2001*a* and "Presidential election" 2001*b* in content description 1202*e*.

Thus, content description conversion section 1203 converts content description 1202*e* into content description 1202*f*. In this way, all the keywords expressing in different manners keywords in content description 1202*e* are described in content description 1202*f*. As a result, since it is possible to describe a plurality of terms in different expressions in a content description, the redundancy of content description is further suppressed.

Content description conversion section 1203 adds "America" 2101*a*, "U.S.A." 2101*b*, "U.S." 2101*c*, "Presidential race" 2101*d* to "United States of America" 2001*a* and "Presidential election" 2001*b* that are English words to collect as "en" 2102*a*, and further collect "◇◇◇◇□Δ×" 2101*c*, "◇◇◇◇" 2101*f*, "◎◎" 2101*g* and "∇○□∇○×" 2101*h* as "ja" 2102*b*.

Thus, terms corresponding to content description 1202*d* are collected for each language. It is thus allowed to distinguish between terms corresponding to content description 1202*d* for each language.

In addition, while the case is described above that a user performs content description conversion using terms of all similarity degrees through entering section 102, it may be possible for a user to perform content description conversion using terms of arbitrary similarities.

In this case, content description conversion section 1203 performs content description conversion using terms of similarity degrees more than a value designated by a user. For example, when a user designates the similarity degree of 0.9 or more in the above-mentioned example, content description conversion section 1203 retrieves "U.S.A." 1904*f*, "◇◇◇◇□Δ×" 1904*a*, and "◎◎" 1904*c* each with the similarity degree of 0.9 or more for "United States of America" 2001*a*, and "∇○□∇○×" 1904*f* and "Presidential race" 1904*j* each with the similarity degree of 0.9 or more for "Presidential election" 2001*b*. Then, content description conversion section 1203 performs content description conversion only using retrieved terms.

As described above, according to the sixth embodiment, a term contained in a content description is exchanged with a synonymous word that is another term having the same meaning as the term and different expression from the term, whereby the redundancy of content description is suppressed in increasing the number of expressions of the term.

As described above, according to the present invention, since it is possible to exchange a term contained in a content description with a term in different expression, the need is eliminated of describing terms in a plurality of different expressions in a content description, and it is thus possible to suppress the redundancy of content description in increasing the number of expressions of the term.

The present invention is not limited to the above described embodiments, and various variations and modifications may be possible without departing from the scope of the present invention.

This application is based on the Japanese Patent Application No.2002-091234 filed on Mar. 28, 2002, and No.2003-043290 filed on Feb. 20, 2003, entire content of which is expressly incorporated by reference herein.

What is claimed is:

1. A content retrieval apparatus comprising:

an input configured to enter a term of a request query;

a content description storage configured to store a content description in which a term is assigned as a viewpoint indicative of content;

a term exchange description storage configured to store a term exchange description in which viewpoint term comprising the term assigned as a viewpoint, and a term describing the viewpoint term in a different expression, are associated and described;

a retriever configured to exchange the viewpoint term assigned to the content description with the term describing said viewpoint term in a different expression using the term exchange description, to generate a new content description, and to retrieve a new content description including a term that is the same as the term of the request query; and an output configured to output a query result for the request query.

2. The apparatus according to claim 1, wherein the term describing the viewpoint term in a different expression is a term describing the viewpoint term in a different language.

3. The apparatus according to claim 1, wherein the term describing the viewpoint term in a different expression is a term synonymous with said viewpoint term.

4. The apparatus according to claim 1, wherein:

the content description includes a plurality of segments assigned as the viewpoint; and the retriever is configured to retrieve a segment that includes the term that is the same as the viewpoint term of the request query.

5. The apparatus according to claim 1, wherein the content description and the term exchange description are described using XML.

6. The apparatus according to claim 1, wherein the content description is described based on ISO/IEC 15938-2 and ISO/IEC 15938-5.

7. A content retrieval apparatus comprising:

an input configured to enter a term of a request query;

a content description storage configured to store a content description in which a term is assigned as a viewpoint indicative of content;

a term exchange description storage configured to store a term exchange description in which a request query term, comprising the term of the request query, and a term describing said request query term in a different expression are associated and described;

a retriever configured to exchange the request query term with the term describing the request query term in a different expression using the term exchange description, to generate a new request query, and to retrieve a content description including a term that is the same as a term of the new request query; and an output configured to output a query result for the query request.

8. The apparatus according to claim 7, wherein the term describing the request query term in a different expression is a term describing the request query term in a different language.

9. The apparatus according to claim 7, wherein the term describing the request query term in a different expression is a term synonymous with the request query term.

10. The apparatus according to claim 7, wherein:

the content description includes a plurality of segments assigned as the viewpoint; and the retriever is configured to retrieve a segment that includes the term that is the same as the request query term, as the viewpoint.

11. The apparatus according to claim 7, wherein the content description and the term exchange description are described using XML.

12. The apparatus according to claim 7, wherein the content description is described based on ISO/IEC 15938-2 and ISO/IEC 15938-5.

13. A method comprising:

entering a term of a request query for a content description in which a term is assigned as a viewpoint indicative of content;

exchanging the viewpoint term, comprising the term assigned as a viewpoint, assigned to the content description with a term describing said viewpoint term in a different expression using a term exchange description in which the viewpoint term and the term describing said viewpoint term in a different expression are associated and described, and generating a new content description;

retrieving a new content description including a term that is the same as the term of the request query; and outputting a retrieval result of the request query.

14. A method comprising:

entering a term of a request query for a content description in which a term is assigned as a viewpoint indicative of content;

exchanging the request query term, comprising the term of the request query, with a term describing said request query term in a different expression using a term exchange description in which the request query term and a term describing said request query term in a different expression are associated and described, and generating a new request query;

retrieving a content description including a term that is the same as a term of the new request query; and outputting a retrieval result of the request query.

15. A computer readable medium for storing a program executable by a computer, comprising:

a term entry code segment that enters a term of a request query for a content description in which a term is assigned as a viewpoint indicative of content;

a term exchanging code segment that exchanges the viewpoint term, comprising the term assigned as the viewpoint, assigned to the content description with a term describing said viewpoint term in a different expression using a term exchange description in which the viewpoint term and the term describing said viewpoint term in a different expression are associated and described, and that generates a new content description;

a retrieval code segment that retrieves a new content description including a term that is the same as the term of the request query; and a result output code segment that outputs a retrieval result of the request query.

16. A computer readable medium for storing a program executable by a computer, comprising:

a term entry segment that enters a term of a request query for a content description in which a term is assigned as a viewpoint indicative of content;

a term exchanging code segment that exchanges the request query term, comprising the term of a request query with a term describing said request query term in a different expression using a term exchange description in which the request query term and the term describing said request query term in a different expression are associated and described, and that generates a new request query;

a retrieving code segment that retrieves a new content description including a term that is the same as a term of the new request query; and a result output code segment that outputs a retrieval result of the request query.

17. A content retrieval apparatus comprising:

an input configured to enter a term of a request query;

a content description storage configured to store a content description in which a term indicative of content is assigned;

a term exchange description storage configured to store a term exchange description in which a content indicative term, comprising the term indicative of content, and a term describing said content indicative term in a different expression are associated and described;

an exchanger configured to exchange the content indicative term with the term describing said content indicative term in a different expression using the term exchange description and to generate a new content description;

a retriever configured to retrieve a new content description including a term that is the same as the term of the request query; and an output configured to output a retrieval result of the request query.

18. The apparatus according to claim 17, wherein the term exchange description describes a plurality of pairs of the content indicative term and the term describing said content description term in a different expression.

19. The apparatus according to claim 17, wherein the term describing the content indicative term in a different expression is said content indicative term described in a different language.

20. The apparatus according to claim 17, wherein the term describing said term assigned to the content description in a different expression is a term synonymous with said term assigned to the content description.

21. The apparatus according to claim 17, wherein the content description and the term exchange description are described using XML.

22. The apparatus according to claim 17, wherein the content description is described based on ISO/IEC 15938-2 and ISO/IEC 15938-5.

23. The apparatus according to claim 18, wherein the exchanger exchanges the content indicative term with a plurality of terms describing said content indicative term in a different expression.

24. A method comprising:

entering a term of a request query for a content description assigned a term indicative of content;

exchanging the term assigned to the content description with a term describing said term assigned to the content description in a different expression using a term exchange description in which the term indicative of content and a term describing said term indicative of content in different expression are associated and described, and generating a new content description;

retrieving a new content description including a term that is the same as the term of the request query; and outputting a retrieval result of the request query.

25. A computer readable medium for storing a program executable by a computer, comprising:

a term entry segment that enters a term of a request query for a content description assigned a term indicative of content;

a term exchange code segment that exchanges the term assigned to the content description with a term describing said term assigned to the content description in a different expression using a term exchange description in which the term indicative of content and the term describing said term indicative of content in a different expression are associated and described, and generating a new content description;

a retrieval code segment that retrieves a new content description including a term that is the same as the term of the request query; and a result output code segment that outputs a retrieval result of the request query.

* * * * *